United States Patent
Nielsen et al.

(10) Patent No.: US 8,873,102 B2
(45) Date of Patent: Oct. 28, 2014

(54) DYNAMIC COLOR SEPARATION AT A DIGITAL PRESS

(75) Inventors: Mary Nielsen, Boise, ID (US); Robert D. Walton, Santa Ana, CA (US); Orhan E. Beckman, Vancouver, WA (US); Timothy E. Stefl, Littleton, MA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2827 days.

(21) Appl. No.: 11/261,130

(22) Filed: Oct. 28, 2005

(65) Prior Publication Data

US 2007/0095235 A1    May 3, 2007

(51) Int. Cl.
| | |
|---|---|
| *G06F 15/00* | (2006.01) |
| *G06K 1/00* | (2006.01) |
| *G06F 3/12* | (2006.01) |
| *G03F 3/08* | (2006.01) |
| *H04N 1/56* | (2006.01) |
| *H04N 1/60* | (2006.01) |

(52) U.S. Cl.
CPC . *H04N 1/56* (2013.01); *H04N 1/603* (2013.01)
USPC .............. 358/1.9; 358/1.13; 358/518

(58) Field of Classification Search
USPC ............... 358/1.1, 1.9, 500, 515, 518
See application file for complete search history.

(56) References Cited

U.S. PATENT DOCUMENTS

| | | | |
|---|---|---|---|
| 5,363,318 A | 11/1994 | McCauley | |
| 5,563,724 A | 10/1996 | Boll et al. | |
| 5,687,300 A | 11/1997 | Cooper | |
| 5,734,800 A | 3/1998 | Herbert et al. | |
| 5,751,326 A | 5/1998 | Bernasconi | |
| 6,340,975 B2 | 1/2002 | Marsden et al. | |
| 6,421,141 B2* | 7/2002 | Nishikawa | 358/1.9 |
| 6,997,979 B2* | 2/2006 | Bauer et al. | 106/31.6 |
| 7,408,673 B1* | 8/2008 | Chinn et al. | 358/1.9 |
| 2002/0102019 A1* | 8/2002 | Piatt et al. | 382/165 |
| 2002/0149785 A1* | 10/2002 | Chu et al. | 358/1.9 |
| 2002/0193956 A1* | 12/2002 | Van de Capelle et al. | 702/81 |
| 2003/0072022 A1* | 4/2003 | Someno | 358/1.13 |
| 2003/0132984 A1 | 7/2003 | Maltz | |
| 2003/0234943 A1 | 12/2003 | Van Bael | |
| 2004/0223172 A1 | 11/2004 | Yoshizawa et al. | |
| 2005/0150411 A1 | 7/2005 | Bestmann | |
| 2005/0212907 A1* | 9/2005 | Teraue | 347/254 |
| 2006/0092195 A1* | 5/2006 | Miwa | 347/5 |

FOREIGN PATENT DOCUMENTS

| | | |
|---|---|---|
| WO | WO 02/071739 A1 | 9/2002 |
| WO | WO 2005/013603 A1 | 2/2005 |

* cited by examiner

*Primary Examiner* — Ming Hon (57) ABSTRACT

A method for automatically generating a color separation at a digital press comprises defining a color ink array of n-color inks. A separation model is constructed at the digital press based on parameters of the digital press and ink parameters of each of the n-color inks. The constructed separation model is applied to an input digital file to enable printing an element of the input digital file using the n-color inks.

23 Claims, 4 Drawing Sheets

DYNAMIC COLOR SEPARATION AT A DIGITAL PRESS

BACKGROUND

Printing via a digital press offers enormous flexibility in color printing. A large number of different colors with varying hue, lightness and chroma are printable onto a media from a color space based on four process color inks or six process color inks. In some instances, a special color ink is installed into a digital press for the sole purpose of printing that special color onto a media because the process colors cannot faithfully reproduce that special color using process inks. These special color inks are sometimes referred to as a spot color. In one example, a spot color corresponds to a highly defined color for printing a brand name logo (e.g. Coca-Cola® red) that must be printed with exacting accuracy.

While the ability to install and print spot colors enhances the versatility of a digital press, the spot color does not contribute to the color gamut generally defined by the process colors normally installed in the digital press. Rather, the spot color co-exists with the process color space without the process color space generally affecting the spot color and without the spot color generally affecting the process color space. In addition, the spot color somewhat limits the process color space in the digital press because the spot color ink takes the place of an additional process color, such as orange or violet, that could be part of the main process color space (e.g. cyan, magenta, yellow, and black).

This situation persists because of the conventional technique of constructing a fixed color space or fixed color gamut, based on the process color inks, prior to application of that color gamut at the digital press. Except for minor adjustments made to the color space at the digital press, the color space remains generally the same before and after installation at the digital press.

With these shortcomings, digital press operators still yearn for more control over color spaces when using a digital press.

SUMMARY

Embodiments of the invention are directed to constructing a color space at a digital press. One embodiment of the invention is directed to a method for automatically generating a color separation at a digital press. The method comprises defining a color ink array of n-color inks. A separation model is constructed at the digital press based on parameters of the digital press and ink parameters of each ink of the n-color inks. The constructed separation model is applied to an input digital file to enable printing an element on a media using the n-color inks.

DETAILED DESCRIPTION

In the following detailed description, reference is made to the accompanying drawings which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

Embodiments of the present invention are directed to automatically constructing a color separation model at a digital press in a dynamic manner based upon inks available at the digital press. In one aspect, the number of inks (e.g., n) available at the digital press are selectable so that a custom color gamut is determined at the digital press. The color separation model enables a custom color gamut unlike a conventional color gamut that is constructed in advance prior to its application at the digital press.

In one embodiment, a custom color gamut based on n-inks comprises a color space expressed by including a full set of process color inks, such as a four ink array (e.g., cyan, magenta, yellow, and black), five ink array (e.g., cyan, magenta, yellow, violet, and black), or a even six or seven ink array. In another embodiment, a custom color gamut based on n-inks comprises a more limited color space comprising a reduced set of process color inks, such as a two ink array (e.g., cyan and yellow) or three ink array (e.g., cyan, violet, and black). In this latter embodiment, other process color combinations are contemplated. Moreover, in another aspect, the number of process color inks defining the color space is varied at the discretion of the operator.

In one embodiment, a custom color gamut based on a selected number (e.g. n) of process color inks is tailored to around one or more primary process colors to achieve a highly focused color gamut. In other words, a color separation model is constructed to form an integrated color space (e.g. a single color space) from the one or more process color inks selected or available at the digital press. These custom color gamuts are unlike a conventional color gamut, which typically aim to provide a comprehensive color gamut for a full range of color printing and which typically are determined prior to application at the digital press.

In one embodiment, a custom color gamut based on n-inks comprises a color space expressed by including at least one spot color and a full set of process color inks, such as a four ink array (e.g., cyan, magenta, yellow, and black) or five ink array (e.g., cyan, magenta, yellow, violet, and black). In another embodiment, a custom color gamut based on n-inks comprises a more limited color space comprising at least one spot color and a reduced set of process color inks, such as a two ink array (e.g., cyan and yellow) or three ink array (e.g., cyan, violet, and black). In this latter embodiment, other process color combinations are contemplated. Moreover, in another aspect, the number of process color inks defining the color space is varied at the discretion of the operator.

In another embodiment, when one of the inks is a spot color ink the custom color gamut comprises a spot color gamut, which comprises a color gamut built with the spot color ink as a focal point in the color space. One or more process color inks and/or other color inks are used in combination with the spot color ink to construct a color gamut, thereby achieving a highly focused color gamut. In other words, a color separation model is constructed to form an integrated color space (e.g. a single color space) from both at least one spot color ink and one or more process color inks. These spot color gamuts are unlike conventional color gamuts which typically aim to provide a comprehensive color gamut for a full range of color printing.

Accordingly, embodiments of the present invention enable freedom to dynamically construct at the digital press a custom color gamut built upon the number of inks (e.g., n-inks) installed at, or selected from the inks installed at, the digital press. In one embodiment, these n-inks comprise a combination of process color inks. In another embodiment, these n-inks comprise a combination of at least one spot color ink and one or more process color inks.

These embodiments of the invention, and additional embodiments of the invention, are described and illustrated throughout FIGS. 1-4.

Figure 1:
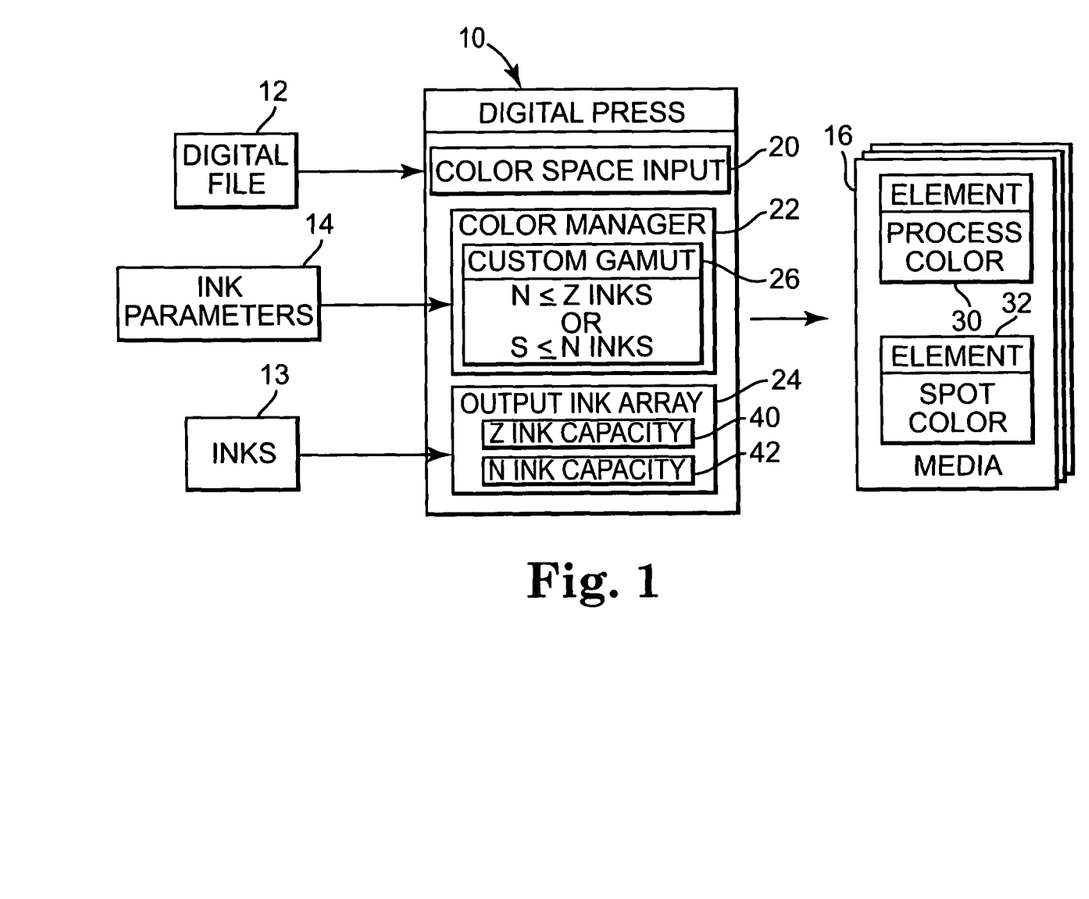
FIG. 1 is a block diagram of a digital press, according to an embodiment of the present invention.

FIG. 1 is a block diagram of a digital press system 10, according to one embodiment of the invention. As shown in FIG. 1, digital press 10 receives a digital file 12, along with inks 13 and ink parameters 14, to enable printing of a process color element 30 and/or spot color element 32 on printable media 16. In another aspect, an element is printed on media 16 that forms a combination of process colors and spot colors. In one embodiment, digital press 10 comprises color space input 20, color manager 22, and output ink array 24.

In one embodiment, color space input 20 of digital press 10 enables identification and selection of color inputs that correspond to colors in digital file 12 for building a color separation to enable printing digital file as elements 30 or 32 via output ink array 24. In one aspect, the color space input 20 operates relative to color manager 22 automatically without user intervention. In another aspect, the operation of color space input 20 relative to color manager 22 is adjustable via user intervention.

Color manager 22 of digital press 10 includes, among other components, mechanisms for generating color separations based on output ink array 24 relative to color space input 20. In one aspect, color manager 22 comprises custom gamut module 26 configured to construct a color gamut based upon n-color inks or s-color inks. The variable n corresponds to a quantity of different color inks actually installed (i.e., present) in output ink array 24 of digital press 10. The variable s corresponds to a quantity of different color inks selected from the n-color inks for inclusion into the color separation model where the variable s has a numerical value less than the variable n.

In one aspect, output ink array 24 of digital press 10 comprises ink capacity parameter 40 and ink present parameter 42. Ink capacity parameter 40 corresponds to the maximum number of different color inks, represented by z, which could potentially be installed into the output ink array 24 of digital press 10. Ink present parameter 42 corresponds to the quantity of different color inks, represented by n, that are actually installed into output ink array 24 for use in printing digital file 12.

Accordingly, embodiments of the invention include a digital press comprising parameters and modules configured to dynamically construct a color separation for a color space input 20 using either s inks (e.g., selected inks) or n inks (e.g., installed inks) in output ink array 24.

Figure 2:
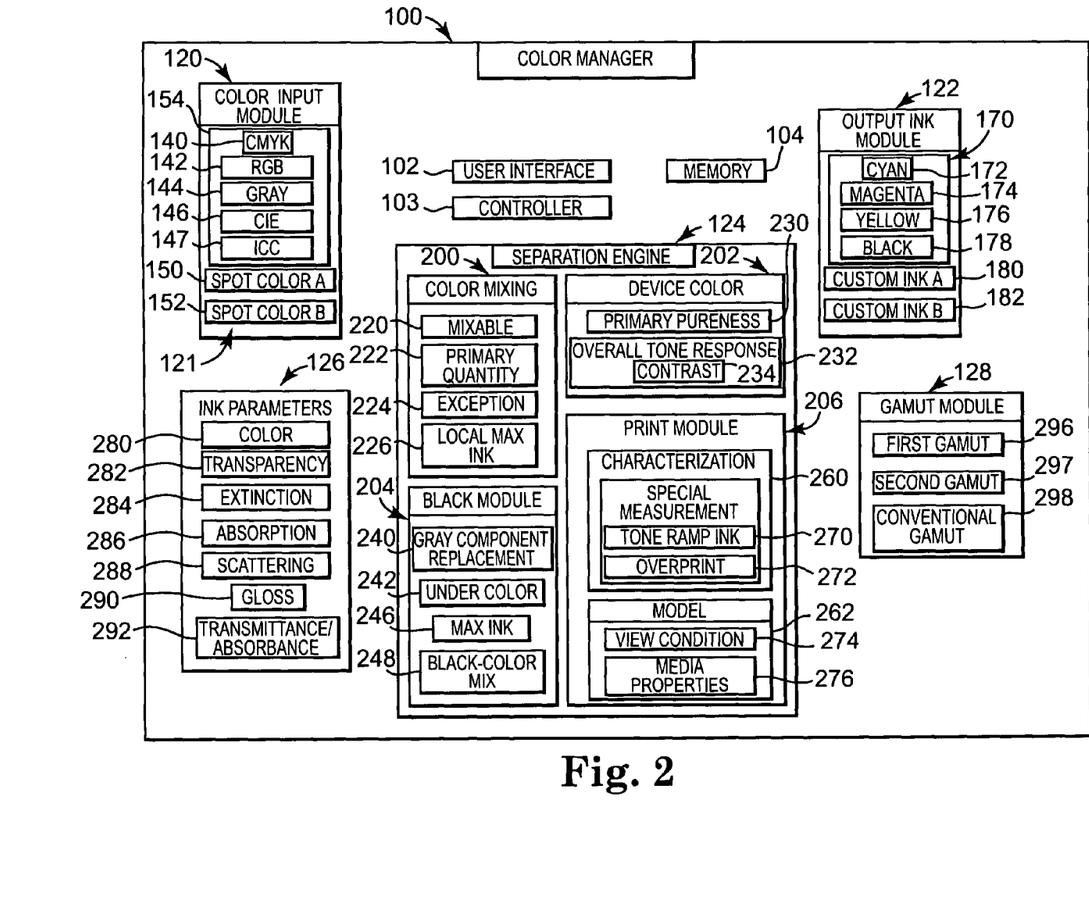
FIG. 2 is a block diagram of a color manager, according to an embodiment of the present invention.

FIG. 2 is a block diagram of a color manager 100, according to an embodiment of the invention. In one embodiment, color manager 100 comprises substantially the same features and attributes of color manager 22 (FIG. 1), as well as additional features and attributes described below. Accordingly, color manager 100 enables automatically building a color separation model at a digital press in a dynamic manner. In one aspect, this constructed color separation model forms a custom color gamut based on an integrated color space including at least one spot color and/or one or more process color inks.

In one aspect, color manager 100 is resident in a digital press.

In another aspect, color manager 100 is located externally of digital press but in communication with the digital press to obtain data about available inks at the digital press for constructing a color separation model and to transmit to the digital press a constructed color separation model for control of and/or use by the digital press. In one aspect, the externally located color manager is located within an off-line input file processor in communication with the digital press.

As shown in FIG. 2, color manager 100 comprises, but is not limited to, user interface 102, controller 103, memory 104, color space input module 120, output ink module 122, separation engine 124, ink parameter module 126, and gamut module 128.

User interface 102 enables selection and control of the various components, parameters, and modules of color manager 100. Moreover, the various components, parameters, and modules of color manger 100 illustrated in FIG. 2 represent actual functions supported by software, firmware, and/or hardware as well as displayable and selectable features of user interface 102. In one embodiment, user interface 102 comprises a graphical user interface. In another embodiment, user interface 102 comprises a mechanism for receiving and processing an electronically-coded job ticket (e.g. a machine readable paper, card, tag, etc.) that automatically provides input data or an input file for processing by color manager 100 (without an operator's intervention) to select and control the various components, parameters, and modules of color manager 100. Finally, in other embodiments, other mechanisms known to those skilled in the art are used to provide input data to color manager 100 to make these selections.

Controller 103 enables operation of color manager 100 and comprises a controller that provides general control of a digital press (e.g. digital press 10 of FIG. 1) including operation of color manager 100, or a controller that is adapted for specific implementation of color manager 100.

Memory 104 enables storage of particular values of parameters of color manager 100, as well as storage and operation of color manager 100 itself. Memory 104 comprises an aspect of color manager 100, or forms a portion of a memory generally supporting digital press including the operation of color manager 100.

Color space input module 120 of color manager 100 enables control over the conversion of a color space input from a digital input file into printable elements on printed media 16. In one embodiment, color space input module 120 comprises a non-limiting input array 121 of selectable color spaces, such as a CMYK (i.e., cyan, magenta, yellow, black) color space 140, RGB (i.e., red, green, blue) color space 142, a grayscale color space 144, a CIE (Commission Internationale de l'Éclairage) color space 146, and an ICC (International Color Consortium) color space 147. In another aspect, RGB color space 142 comprises a Calibrated RGB color space. In one aspect, a CIE color space 146 comprises a CIELab color space while in another aspect, CIE color space 146 comprises a CIEBased color space.

At least one of the color spaces 140-147 of array 121 are identified within each input digital file 12 (FIG. 1) to enable building a color separation model for each input digital file 12 relative to the n-color inks or s-color inks from output ink module 122. Moreover, array 121 is not strictly limited to the color spaces identified in FIG. 2, as other color spaces known in the art or developed in the future can be used as the color space input for building a color separation model at the digital press.

In another embodiment, color space input module 120 also comprises spot color A input 150, and spot color B input 152, which enable selecting color spaces for named colors, special colors, and named spot colors. In one aspect, spot color inputs 150, 152 each comprise one of the spot colors of the PANTONE® Matching System (or another color system) be produced from a directly corresponding spot color ink (in output ink array 24) and/or produced via a color gamut simulation from process color inks. In other embodiments, more spot colors or fewer spot colors than spot color input 150,152 are included in color space input module 120. In other words, color input array 121 is not limited to two spot color inputs.

Ink parameters module 126 of color manager 100 enables receiving and storing particular parameters associated with each ink. Moreover, data associated with each of these parameters, for each ink, are used to construct a color separation model via operation of separation engine 124. These ink parameters for each ink are typically provided in an electronic form with each ink to enable communicating the ink parameters of each ink to separation engine 124 (and/or controller 103) of a digital press (e.g., digital press 10). In one embodiment, ink parameters module 126 of color manager 100 comprises color parameter 280, transparency parameter 282, extinction parameter 284, absorption parameter 286, scattering parameter 288, gloss parameter 290, and transmittance/absorbance parameter 292.

In one aspect, color parameter 280 identifies a hue of the ink (e.g., cyan, blue, etc.) while transparency parameter 282 identifies a transparency of the ink. Extinction parameter 282 identifies wavelength-related absorption of light, while absorption parameter 286 identifies an absorption of an ink relative to a media. Scattering parameter 288 identifies a relative measure of how the ink causes light to scatter from the ink. Gloss parameter 290 identifies a glossiness of an ink while transmittance parameter 292 identifies the extent to which the ink transmits light through the ink.

Separation engine 124 of color manager 100 enables constructing a color separation model based upon a combination of a color space input selected via color space input module 120, inks selected via output ink module 122, and specific ink parameters available via ink parameter module 126. In particular, separation engine 124 enables constructing the color separation model automatically at the digital press based on either all inks available at the digital press or a lesser number of inks selected from those available at the digital press. Accordingly, separation engine 124 enables construction of a color gamut at the digital press that is dynamic because the color gamut is changed (i.e., is rebuilt) in accordance with the available inks at the digital press. In contrast, a conventional gamut is static and based on an ink set that remains fixed regardless of which inks are actually installed at the digital press.

In one embodiment, separation engine 124 comprises, but is not limited to, color mixing module 200, device color module 202, black module 204, and print module 206.

Color mixing module 200 of separation engine 124 comprises, but is not limited to, mixable colors parameter 220, primary quantity parameter 222, exception parameter 224, and local maximum ink parameter 226. In one aspect, mixable colors parameter 220 comprises information (e.g., a table or compatible properties) of mixable colors to enable determining which types of colors can be mixed together to maximize the color gamut but make efficient use of inks. Because color manager 100 constructs a spot gamut to achieve custom gamuts, any combination of inks are potentially available. However, practically speaking, certain combinations of color would not likely be combined in a custom color separation model.

In one aspect, primary quantity parameter 222 determines the number of primary colors that are mixable to form a color, and establishes rules to choose the right inks based on a relationship between the inks with respect to their color properties, such as their position in a hue circle. In one aspect, the color exception parameter 224 enables compensation in a color space for inks that comprise very light colors or very dark colors. In one aspect, the localized maximum ink coverage parameter 226 sets a limit on the maximum amount of ink allowed to cover a given area depending upon which color inks form the "mix".

Black module 204 of color manager 100 enables control over black generation for each color separation model. In one embodiment, black module 204 comprises, but is not limited to, gray component replacement (GCR) parameter 240, under color parameter 242, maximum ink parameter 246, and black-color mix parameter 248. Gray component replacement (GCR) parameter 240 determines a policy for replacing process color areas in an element in which the parameters of the process color inks (e.g., cyan, magenta, and yellow) produce a gray appearance. These "gray areas" are replaced with black ink, according to gray level threshold set via the gray component replacement parameter. Undercolor removal parameter 242 enables compensating for ink trapping in neutral shadow areas of a printed element by replacing a combination of cyan, magenta, and yellow inks (or other process color combinations that can be used to produce the neutral shadow area) with a black ink. In one aspect, this compensation enables reducing a total amount of ink used to reproduce an element while improving color quality by minimizing poor trapping associated with the neutral shadow areas printed via process color inks (instead of black).

Maximum ink coverage parameter 246 of black module 204 determines a maximum quantity of inks permitted in a given area for the output color. In particular, printing quality and color quality suffers if too much ink is applied to the printable media. Accordingly, maximum ink coverage parameter 246 insures that as different color inks are mixed, the total amount of ink applied in an area does not exceed a predetermined threshold. Black-color mixing parameter 248 determines a width of black printing in areas including both black and color to address ink bleed issues as well as to control the visibility of the black ink in highlights and sometimes midtones.

Device color module 202 of color manger 100 comprises, but is not limited to, primary color pureness parameter 230 and an overall tone response 232 including a contrast parameter 234. Primary color pureness parameter 230 enables control of requirements for a pureness or saturation of the mapping of primary colors in the input space to pure inks (rather than combinations of inks) in the output print. Overall tone response parameter 232 enables control of requirements for imaging parameters such as the contrast of images printed using this separation and an overall tone response for each ink individually, as well as for using mixes of inks as a whole.

Print module 206 of color manager 100 comprises, but is not limited to, a print characterization parameter 260 and a print model parameter 262. In one aspect, the characterization module 260 includes a spectral measurement mechanism for a tone ramp ink parameter 270 and an overprint parameter 272. The parameters 270, 272 of characterization module 260 identify data obtained at the digital press from electronically evaluating color as printed onto a media by the digital press The overprint parameter 272 identifies spectral measurements associated with mixes of primary inks, while tone ramp ink parameter 270 identifies spectral measurements associated with a tone response for each ink individually.

In another aspect, print model parameter 262 comprises a viewing condition parameter 274 and a media properties parameter 276. In particular, the viewing condition parameter 274 identifies the conditions under which a printed media will be viewed, such as an illuminant spectral color, brightness, background, surround, etc. The media properties parameter 276 identifies properties unique to one or more printable mediums used at the digital press, and include factors such as a medium color, brighteners, finishes, glosses, over coats, etc.

Gamut module 128 of color manager 100 stores current and/or previous specific color gamuts based upon color separation models constructed via color manager 100. In one aspect, gamut module 128 comprises first gamut parameter 296, second gamut parameter 297, and conventional gamut parameter 298.

Conventional color gamut parameter 298 enables storage of a conventional color gamut, supported by a conventional look-up table, as used for a standard set of color process inks (e.g., cyan, magenta, yellow, and black) with or without additional inks (e.g., orange, violet). The gamut associated with a conventional color gamut parameter 298 is generally constructed external of digital press 10 based upon known ink parameters, and their generally known interaction with digital press 10. Once constructed, the gamut associated with conventional color gamut parameter 298 generally does not change at the digital press because the digital press operates on a fixed set of output inks, such as cyan ink, magenta ink, yellow ink, and black ink. Accordingly, except for minor variations such as adjusting dot gain for a particular process color or color simulation, the conventional color gamut does not change. Moreover, a conventional gamut generally does not change in response to installation of spot color(s) at a digital press.

First gamut parameter 296 stores a color gamut based upon a color separation model dynamically constructed at the digital press according to a first set of inks (e.g., n color inks) installed at the digital press or to a subset of the inks selected at the digital press (represented by the variable s) from among the inks installed at the digital press (represented by the variable n).

Second gamut parameter 297 stores a color gamut based upon a color separation model dynamically constructed at the digital press according to a second set of inks (e.g., n color inks) installed at the digital press or to a subset of inks (e.g., s color inks) selected at the digital press from among the inks (e.g. n color inks) installed at the digital press. The second set of inks (or subset of inks) associated with the second gamut parameter 297 comprises a different combination of color inks than the first set of inks associated with the first gamut parameter 296.

In one aspect, either first gamut parameter 296 or second gamut parameter 298 enable storage of a particular color separation model in memory (e.g., memory 104) includes one or more process color inks (e.g. cyan, magenta, yellow, and black). In another aspect, either first gamut parameter 296 or second gamut parameter 298 includes one or more spot color inks, such as a Pantone® color or spot color of another color system.

In one aspect, each of first gamut parameter 296 and/or second gamut parameter 297 are stored in gamut module 128 so that upon removal of one or more inks of the first set of inks (or second set of inks, respectively), gamut module 128 maintains in a database the color separation model constructed for first gamut parameter 296 and/or second gamut parameter 297. Accordingly, upon installation or selection of a different set of inks, a different first gamut 296 is constructed while maintaining previously constructed color separation models and their associated color gamuts in the database of gamut module 128.

In another aspect, gamut module 128 does not store previously constructed color separation models (and associated color gamuts) but instead only identifies currently constructed color separation models via first gamut parameter 296 or second gamut parameter 29. This insures that the color separation model constructed and applied at the digital press is as accurate as possible based on the most up-to-date operation and parameters of the digital press as well as the most up-to-date parameters of each ink installed in the digital press.

In another embodiment, separation engine 124 of color manager 100 also embodies empirical color models, that are incorporated within one or more modules 200-206 (or other aspects) of separation engine 124. In one aspect, separation engine 124 incorporates an empirical ink criteria according to a Kubelka-Munk model. In another aspect, separation engine 124 incorporates an empirical ink criteria according to a Beer-Lambert model regarding absorbance and transmittance. In another aspect, additional empirical models related to color separation models, as known to those skilled in the art, are incorporated into one or modules 200-206 of separation engine 124, and more generally into color manager 100.

In one embodiment, output ink module 122 enables specifying which inks are used to print a digital file as an element on a printable media, as enabled via separation engine 124 and color space input module 120. In one embodiment, output ink module 122 comprises output ink array 170 including cyan ink 172, magenta ink 174, yellow ink 176, black ink 178, custom ink A 180, and custom ink B 182.

In one embodiment, custom ink A 180 and/or custom ink B 182 comprises a spot color ink, such as a spot color from a color system such as a PANTONE® Matching System, or other color system. Famous examples of spot colors include COCA-COLA® red or JOHN DEERE® green.

In another embodiment, custom ink A 197 comprises an orange ink and custom ink B 198 comprises a violet ink. In this embodiment, output ink array 191 is used as a six ink process color mechanism to accomplish an expanded color gamut simulation.

According, in cooperation with output ink array 24 of digital press 10 (FIG. 1), output ink module 122 of color manager 100 enables construction of a separation model based on inks actually installed, or inks selected from those actually installed, at the digital press.

Figure 3:
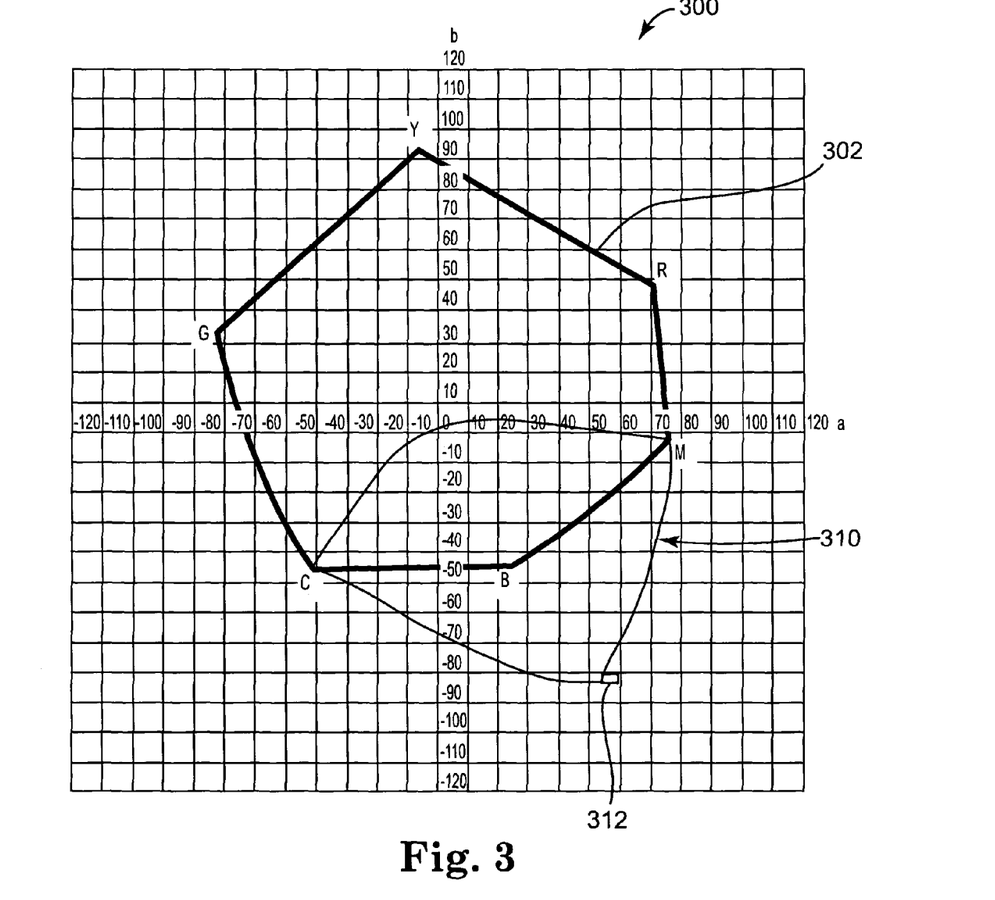
FIG. 3 is an illustration of an n-ink color gamut, according to an embodiment of the present invention.

FIG. 3 is a color gamut diagram, according to an embodiment of the invention. As shown in FIG. 3, diagram 300 defines an x-y-z plane for mapping a color gamut in an a* versus b* 2-dimensional view of the three dimensional CIELab color space. Diagram 300 is an example of a conventional color gamut 302 and a non-limiting example of a custom color gamut 310 based on n-color inks available at a digital press (or s-color inks selected from the n-color inks). Embodiments of the invention enable selecting one or more process colors to construct a gamut that provides increased chroma in a particular hue or a targeted increase in a lightness or darkness of a particular hue. In one embodiment, the selected colors also comprise a spot color and one or more process colors. FIG. 3 provides an illustration of limited gamut using a subset of the conventional process colors as well as an increased chroma via a particular hue associated with a spot color.

In one aspect, the custom color gamut 310 of diagram 300 represents a color separation model based on one or more process color inks and a spot color associated a color point 312. As shown in FIG. 3, custom color gamut 310 has a generally smaller overall size than conventional color gamut 302 while being generally larger in a region surrounding color point 312 associated with the spot color. Moreover, in one aspect, custom color gamut 310 has a less regularly shaped border relative to a conventional color gamut 302, thereby revealing a relatively narrow focus tailored about the custom color gamut 310. However, this smaller, more restricted color gamut is acceptable to the operator because the custom color gamut 310 is not aimed at producing a comprehensive color gamut or widely balanced color gamut but instead enables greater color range in a narrowly focused area surrounding a spot color, or surrounding one or more selected primary colors.

In another aspect, a color point 312 in a custom color gamut 310 is associated with a process color or other specialized color instead of a spot color.

In one aspect, a color manager (e.g., color manager 100 of FIG. 2) enables constructing many different custom color gamuts with each different custom color gamut defining a unique color space based on a combination of process colors or based on a combination of one or more process colors and at least one spot color. Accordingly, embodiments of the invention are not strictly limited to a single conventional gamut 302 and single custom gamut 310 as shown in FIG. 3.

Figure 4:
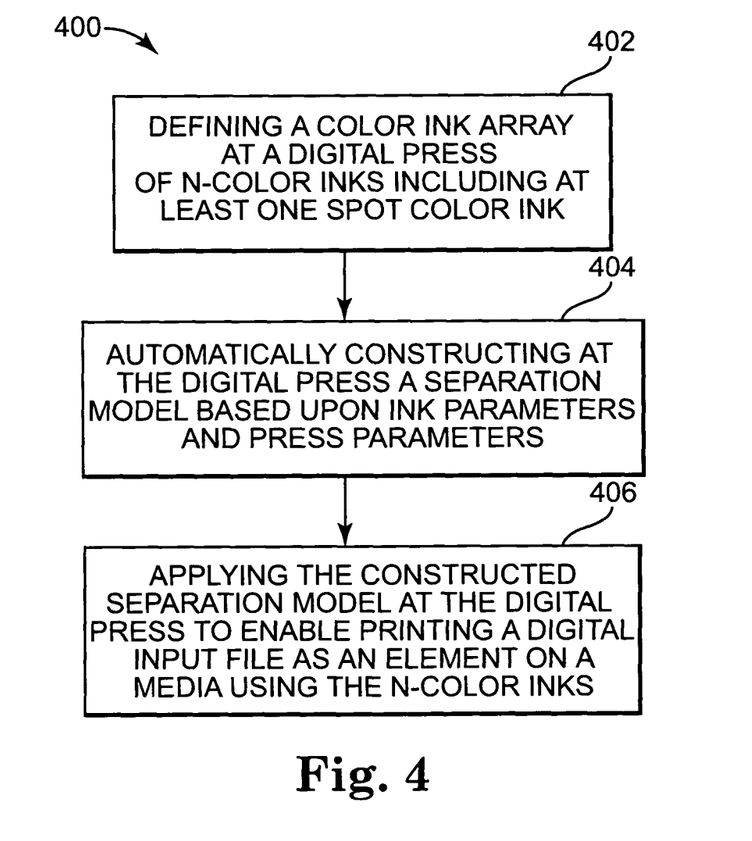
FIG. 4 is a flow diagram of a method of constructing a color gamut at a digital press, according to an embodiment of the present invention.

FIG. 4 is a flow diagram of a method 400 of constructing a color separation model at a digital press, according to an embodiment of the invention. In one embodiment, method 400 is performed using digital press 10 including color manager 100 as described and illustrated in association with FIGS. 1-3. In another embodiment, method 400 is performed using systems other than digital press 10 and color manager 100.

As shown in FIG. 4, at 402 method 400 comprises defining a color ink array at a digital press of n-color inks. In one aspect, the n-color inks include at least one spot color ink while in another aspect the n-color inks exclude spot color inks. In one aspect, the n-color inks correspond to a number of different color inks installed at a digital press. In one aspect, n corresponds to a number of selected different color inks at the digital press that is a lower total number of inks than actually installed at the digital press, and which is also represented by the variable s. In other words, the color ink array used in constructing a digital press is not limited to including all the installed inks. However, the color ink array excludes inks not installed at the digital press so as to tailor construction of a color separation model at the digital press only to actually available inks or actually selected inks.

At 404, a separation model is automatically constructed at the digital press based upon ink parameters and parameters associated with the digital press, such as one or more parameters associated with a separation engine or empirical ink models. In one aspect, the digital press maintains parameters for constructing a color separation model for inks that are present regardless of which set of inks are employed. A value of one or more of these parameters may be partially dependent on the properties of particular inks, but the parameters are primarily related to construction of any color separation model and related to the operation of the digital press independent of the specific color of inks used to make the color separation model. The ink parameters are associated with specific color inks installed at the digital press. These ink parameters are electronically installed at the digital press to enable construction of the color separation model specific to the installed or selected color inks.

At 406, the constructed separation model is applied at the digital press to enable printing a digital file as an element on a printable media using the n-color inks (or s-color inks). Once the separation model is constructed, thereby producing an operational color gamut, a digital file is processed by the digital press for printing according to the dynamically constructed color separation model. This color separation model is used to print as many different digital files as desired at the digital press until a different color separation is required to print a different digital file or different type of digital file.

Embodiments of the present invention are directed to a digital press that automatically constructs a color separation model based on inks installed at the digital press. The color separation model is constructed at the digital press and varies based on the number and/or combination of different specific color inks installed (or selected) at the digital press. Consequently, the color separation model is dynamic, unlike fixed color separation models that are determined before application at a conventional digital press. The dynamic color separation models produce color gamuts that are not limited to comprehensive color gamuts based only on traditional process color ink arrays but encompass innovative custom gamuts tailored around one or more custom colors.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A method of printing comprising:
    performing automatically at a digital press:
        providing an array of actually installed different colors inks in the digital press having a quantity that is selectably less than a maximum quantity of potentially installable inks at the digital press;
        creating a color gamut file, based on the actually installed different color inks, and via constructing a color separation model based on at least one color separation parameter of the digital press and on ink parameters of each of the actually installed different color inks;
        storing the created color gamut file; and
        applying the created color gamut file, which expresses the constructed separation model, to enable printing an element of a digital input file on a media using the actually installed different color inks.

2. The method of claim 1 wherein providing the array of actually installed different color inks comprises:
    providing the actually installed respective color inks to include at least one process color ink selected from the group of a cyan ink, a magenta ink, a yellow ink, and a black ink.

3. The method of claim 2 wherein providing the color ink array further comprises a red ink, a blue ink, and a green ink.

4. The method of claim 2 wherein creating the color gamut file, based on the actually installed different color inks, via constructing the separation model comprises:
    providing the actually installed different color inks as at least one spot color ink; and integrating the at least one process color ink and the at least one spot color ink into a single color space.

5. The method of claim 4 wherein creating the color gamut file, based on the actually installed different color inks, via constructing the separation model comprises:
focusing the separation model about the at least one spot color ink to define the color gamut file as a spot gamut file with the at least one spot color defining a primary hue of the separation model.

6. The method of claim 1 wherein constructing, based on the actually installed different color inks, the color separation model comprises:
defining the at least one color separation parameter of the digital press to include at least one member of a group comprising:
a color mixing criteria;
a black generation criteria;
a device color criteria including a primary color pureness criteria, an over all tone response criteria; and
a print model criteria.

7. The method of claim 6 wherein the ink parameters of each respective ink in the array comprise at least one member of a group comprising:
a color parameter;
a transparency parameter;
an extinction parameter;
an absorption parameter;
a scattering parameter;
a gloss parameter; and
a spectral transmittance parameter.

8. The method of claim 6 wherein the black generation criteria are based on at least one of:
a gray component replacement parameter;
an under color removal parameter;
a maximum ink coverage parameter; and
a black-color mixing parameter.

9. The method of claim 6 wherein the color mixing criteria comprises at least one of:
a mixable color parameter;
a primary color quantity parameter;
a color exception parameter; and
a local maximum ink parameter.

10. The method of claim 6 wherein the print model criteria comprises:
providing a print characterization parameter including spectral measurements of the respective different color inks of the array as printed at the digital press; and
providing a printing conditions parameter including:
a printing environment condition parameter identifying ambient conditions in the printing environment; and
a printing media parameter identifying properties of the media at the digital press.

11. The method of claim 1 and further comprising:
printing, via the color gamut file, the element on the media at the digital press.

12. The method of claim 1 wherein creating the color gamut file, based on the actually installed different color inks, via constructing a separation model comprises:
providing the respective different color inks of the array to include at least one spot color ink; and
defining a plurality of colors printable at the digital press wherein the plurality of spot colors is within a color range adjacent to the at least one spot color ink within a color space defined by the constructed separation model.

13. The method of claim 1, wherein the digital input file is separate and independent from the color gamut file.

14. The method of claim 1, wherein providing the array comprises selecting a subset of the actually installed different color inks at the digital press,
wherein creating the color gamut file is based on the at least one color separation parameter of the digital press and on ink parameters of each ink of the selected subset of different color inks, and
wherein applying the color gamut file to enable printing of the element of the digital input file includes using the selected subset of the different color inks.

15. A color manager for a digital press comprising:
a color ink array including a plurality of n-color inks, wherein the n-color inks correspond to a quantity of inks actually installed in a digital press; and
a color gamut module including:
a color ink selector configured to select a first number of different color inks from the n-color inks; and
a separation engine configured to automatically construct a first color gamut file at the digital press according to ink parameters of each ink of the selected first number of n-color inks in cooperation with a color separation criteria of the digital press.

16. The color manager of claim 15 wherein the separation engine is configured, based upon a change from the first number of the different inks to a different second number of the different inks, to automatically construct at the digital press a second color gamut file according to ink parameters of each ink of the second number of n-color inks in cooperation with the color separation criteria of the digital press.

17. The color gamut manager of claim 15 wherein the separation criteria of the digital press comprises at least one of:
a color mixing criteria;
a black generation criteria;
a device color criteria; or
a print evaluation criteria.

18. A digital press comprising:
means for printing an element of a digital input file onto a printable media; and
means for automatically building, at the digital press, a color gamut file based on a color ink array of the means for printing in which the color gamut file is based on a variable number of color inks including at least one spot color ink and at least one process color ink.

19. The digital press of claim 18 wherein the means for automatically building comprises:
defining the at least one spot color ink and the at least one process color ink by all of the spot color inks and process color inks, respectively, installed in the color ink array of the means for printing; and
rebuilding at the digital press the color gamut file each time that one of the at least one spot color ink and the at least one process color ink is removed or replaced with at least one of a different spot color ink or a different process color ink.

20. The digital press of claim 18 wherein the means for automatically building comprises:
using ink parameters of each respective spot color ink and each respective spot color ink of the color ink array in cooperation with at least one color separation criteria of the digital press to build a color separation model configured to produce the color gamut file.

21. The digital press of claim 18, wherein the digital input file is separate and independent from the color gamut file.

22. A non-transitory computer-readable medium having computer-executable instructions for performing a method of printing comprising:

providing an array of actually installed different colors inks in the digital press having a quantity that is selectably less than a maximum quantity of potentially installable inks at the digital press;

creating a color gamut file, based on the actually installed different color inks, and via constructing a color separation model based on at least one color separation parameter of the digital press and on ink parameters of each of the actually installed different color inks;

storing the created color gamut file; and applying the created color gamut file, which expresses the constructed separation model, to enable printing an element of a digital input file on a media using the actually installed different color inks.

23. The medium of claim 22 wherein providing the array comprises:

providing the different inks to include at least one spot color ink and at least one process color ink selected from the group of a cyan ink, a magenta ink, a yellow ink, and a black ink, and wherein constructing a separation model comprises integrating the at least one spot color ink and the at least one process color ink into a single color space.

* * * * *